US006120910A

United States Patent [19]

Szenics

[11] Patent Number: 6,120,910

[45] Date of Patent: Sep. 19, 2000

[54] STRINGED MUSICAL INSTRUMENT

[76] Inventor: Jonathan M. Szenics, 1 Braintree Ct., Flemington, N.J. 08822

[21] Appl. No.: 09/259,731

[22] Filed: Mar. 1, 1999

[51] Int. Cl.[7] .......... G10D 3/00; B32B 9/04

[52] U.S. Cl. .......... 428/447; 428/408; 428/697; 428/698; 428/701; 428/702; 84/267; 84/291

[58] Field of Search .......... 428/216, 334, 428/408, 446, 447, 697, 698, 701, 702; 84/267, 274, 275, 291, 293

[56] References Cited

U.S. PATENT DOCUMENTS

| | | | |
|---|---|---|---|
| 4,846,039 | 7/1989 | Mosher | 84/293 |
| 4,873,907 | 10/1989 | Decker, Jr. et al. . | |
| 4,969,381 | 11/1990 | Decker, Jr. et al. . | |
| 5,085,115 | 2/1992 | Schlink | 84/310 |
| 5,124,179 | 6/1992 | Garg et al. . | |
| 5,125,312 | 6/1992 | Fishman et al. | 84/291 |
| 5,126,206 | 6/1992 | Garg et al. . | |
| 5,147,687 | 9/1992 | Garg et al. . | |
| 5,160,544 | 11/1992 | Garg et al. . | |
| 5,189,235 | 2/1993 | Fishman et al. . | |
| 5,190,807 | 3/1993 | Kimock et al. . | |
| 5,337,644 | 8/1994 | Fishman et al. . | |
| 5,508,368 | 4/1996 | Knapp et al. . | |
| 5,527,596 | 6/1996 | Kimock et al. . | |
| 5,616,873 | 4/1997 | Fishman et al. . | |
| 5,905,219 | 5/1999 | Westheimer | 84/452 |

*Primary Examiner*—Timothy M. Speer
*Assistant Examiner*—Bryant Young
*Attorney, Agent, or Firm*—Watov & Kipnes, P.C.

[57] ABSTRACT

A string musical instrument having a body portion and one or more strings secured thereto, thereby defining a stringed portion. The stringed portion being composed of a polymeric material, includes a surface which comes into contact with the strings when a musician plays the musical instrument. The surface having thereon a first composite layer being operatively engaged to the surface and including one or more intermediate layers and an outer hard and low friction diamond-like carbon layer.

15 Claims, 6 Drawing Sheets

STRINGED MUSICAL INSTRUMENT

FIELD OF THE INVENTION

The present invention relates generally to stringed musical instruments. More particularly, the present invention relates to the composition of an elongated support for strings of a stringed musical instrument.

BACKGROUND OF THE INVENTION

Stringed musical instruments are of ancient origin. During the succeeding centuries, many forms of such instruments have been developed. Many of these instrument forms are configured having a relatively narrow neck structure. That neck structure very commonly has an end at which the instrument strings are attached in such a manner as to permit adjusting of the tension thereof, and has another end affixed to a base of a body on which a bridge or saddle is provided to secure the opposite ends of these strings. The neck typically also has a structural portion having an exposed surface below the strings which is referred to as a fingerboard.

In the development of such instruments, fingerboards have resulted thereof that are either of the fretted type, or the fretless type, depending on the particular instrument in which it is located. A fretted fingerboard has a series of elongated narrow structures spaced apart from one another that project above a larger, major fingerboard surface. Each member of these series of structures have its long axis extending transversely across the major axis of the neck, and each is located at a precise location along the length of the fingerboard.

The purposes of these structures is to permit the musician using the instrument to shorten the effective length of the vibrating portion of a string positioned thereover. The musician is enabled to repeatedly select the effective lengths of the string at precise locations, each of which is determined using the fret chosen by the musician for this purpose, to thereby alter the pitch or frequency of the sound produced by the vibrating string. If the musician stops the string against the fingerboard major surface on the side of the fret opposite the bridge or saddle, the string will also be stopped against that fret and a precise vibration frequency in the string can thus be set determined by the distance of the fret from that bridge or saddle.

One can shorten the effective vibrating length of a string, causing it to vibrate at a higher frequency, by "stopping" it somewhere along its length—that is pressing it directly with a finger against the fingerboard as with violins, or pressing it against a fret with a finger as with guitars, or holding a slide or bottleneck against it. The term "stopping point" means the precise point at which the string contacts the fingerboard under pressure from the finger. With fretless instruments like violins, it is the musician's job to know the stopping point, i.e., how much to shorten the length of the string to get a desired pitch. With fretted instruments like most guitars, it is the maker's job to place the frets in the right locations along the neck. Thus, the string contacts the fret when the musician applies pressure to the string, and the contact between the fret and the string ensures a desired length of the string to produce a selected pitch.

With a fretless fingerboard, the stopping point is critical to musical performance and is determined solely by the musician. The resulting vibration of the length of the string between the stopping point and the bridge or saddle is determined by the precise position of the stopping point. Thus, there is no fret to predetermine the stopping point so as to provide a corresponding fixed frequency of vibration of the string. Instead, the musician must determine the stopping point by precise placement of the finger. Quite obviously, it is more difficult to play a fretless instrument than one having frets. With practice, the musician can memorize pitch locations on the fingerboard. The musician can even place visual pitch markers there, which is useful in realizing unusual tunings.

A fretless instrument, although more difficult to play provides advantages over a fretted instrument. A considerably wider range of frequencies for each string can be selected by a musician playing a fretless fingerboard than can be selected by a musician playing a fretted fingerboard. In the latter situation, the number of different frequencies available for a fretted instrument is, as a general matter, limited by the number of frets provided.

More specifically, the fretless fingerboard is not limited to a particular tonal scale, or the set of tones available for a string in a fretted fingerboard predetermined by the placement of frets along the fingerboard. In addition, certain playing techniques for varying pitch are desired to give unusual acoustical results, particularly in jazz and rock music. Also, in such music, other kinds of sounds are desired to be generated which result from "slapping" the strings with the thumb or "popping" the strings by pulling on them. A wider range of sounds from these methods will result when used on a fretless fingerboard differing from the sounds obtained using them on a fretted fingerboard as has been done traditionally.

To date, there have been a variety of materials used to construct stringed musical instruments. Such materials include composite materials used in the construction of the body, neck, fingerboard, and transducers, if the instrument is electrified. Examples include flakeboard laminates for tops and backs, plastic resin/fiberglass (both with and without further reinforcement with carbon fiber, aramid, and the like) solid and hollow bodies. Various materials have also been used for the necks including wood, fiberglass, carbon aramid, different metal alloys for truss rods, and plastic composites for fingerboard construction.

One problem associated with fretless fingerboards is premature wear of the playing surface. In various electrified instruments such as electric guitars, bass guitars, pedal steel guitars, lap steel guitars, and acoustic dobros, for example, nickel steel alloy strings are utilized. Such strings are exceedingly harder than the surface of the fingerboard, thus, leading to rapid premature wear of the surface. In fretted fingerboards, there is less concern for fingerboard wear, since the frets directly contact the strings. The frets are typically made of the same nickel steel alloy as the strings and better can resist the wear arising from contact with the metal strings. In acoustic instruments, strings with less hardness are used, but wear and abrasion to the fretless fingerboard, typically made of wood, still occurs.

In fretless stringed musical instruments, the musician's finger acts as a fret to shorten the effective vibrating length of the pressed string for tonal sound (i.e. determines the stopping point). Fingers are soft, and with direct contact they damp a string's vibration considerably. That is why most plucked string instruments have frets: the fret forms a hard well defined terminus to the string's vibrating length, so the finger does not touch the active part of the string. With more massive strings, the greater kinetic energy allows a more fuller tone in spite of the damping. One plucked fretless string instrument, for example, is the fretless bass guitar. Its notes are generally lower in frequency than encountered in a standard-tuning guitar. As a result, there is no significant problem with damping of the timbre by the fingers when the string is directly pressed against the fingerboard. Another way to improve the tonal qualities of a fretless stringed instrument is to have a fingerboard surface with a very low frictional resistance. This minimizes the damping effects of the fingered vibrating string.

To improve wear resistance and tonal qualities especially with heavier than usual gauge strings, several materials such as aluminum, steel, glass, and plastic have been used. Aluminum and steel fingerboards have been acceptable materials in terms of wear resistance and string tone, but with nickel strings, considerable wear still occurs. Glass fingerboards have good hardness and very low frictional resistance than metal surfaces for excellent tones, but glass is breakable and susceptible to scratches and abrasions. Plastic fingerboards provide acceptable tones but the wear and abrasion resistance is unacceptable.

For the foregoing reasons, there is a need for a stringed musical instrument having an improved fretless fingerboard that resists the wear and abrasion of metal strings better than prior fingerboards (fretted and fretless), enhances the tone quality, is more flexible to play, is simple to fabricate, and permits playing techniques not satisfactorily possible with fretted instruments.

SUMMARY OF THE INVENTION

The present invention is generally directed to a stringed musical instrument with an improved playing surface on a fretless fingerboard. The fingerboard includes a polymeric substrate coated with a composite layer with an outer layer of a hard and low friction diamond-like carbon. In accordance with the present invention, the disclosed abrasion wear resistant coated fingerboard substantially reduces the disadvantages and shortcomings associated with prior art fingerboards. The principles of the present invention may be applied to many different stringed musical instruments besides the exemplary electric guitar as illustrated and discussed hereinafter. A highly important technical advantage of the invention is that the resultant multi layer composite structure has all of the typical attributes of plastics, such as high tensile and impact strength, while exhibiting excellent resistance to wear and chemicals.

The present invention is specifically directed to a stringed musical instrument comprising a body portion including one or more strings secured thereto thereby defining a stringed portion, said stringed portion comprising a polymeric material, and including a surface which comes into contact with the strings when a musician plays the musical instrument, said surface having thereon a first composite layer comprising:

a) an adhesion-mediating layer at least 3 microns thick operatively engaged to and disposed towards said surface of said polymeric stringed portion, said adhesion-mediating layer comprising a polysiloxane polymer having a high elasticity and capable of forming a strong chemical bond to said surface of said polymeric stringed portion;

b) a chemically vapor deposited first midlayer operatively engaged to said adhesion-mediating layer and comprising a material devoid of alkali metal atoms and fluorine;

c) a chemically vapor deposited first layer of diamond-like carbon operatively engaged to and disposed immediately adjacent said first midlayer and away from said surface of said polymeric stringed portion; and d) said first midlayer being capable of forming a strong bond to said adhesion mediating layer and diamond-like carbon.

BRIEF DESCRIPTION OF THE DRAWINGS

The following drawings in which like reference characters indicate like parts are illustrative of embodiments of the invention and are not to be construed as limiting the invention as encompassed by the claims forming part of the application.

DETAILED DESCRIPTION OF THE INVENTION

Figure 1:
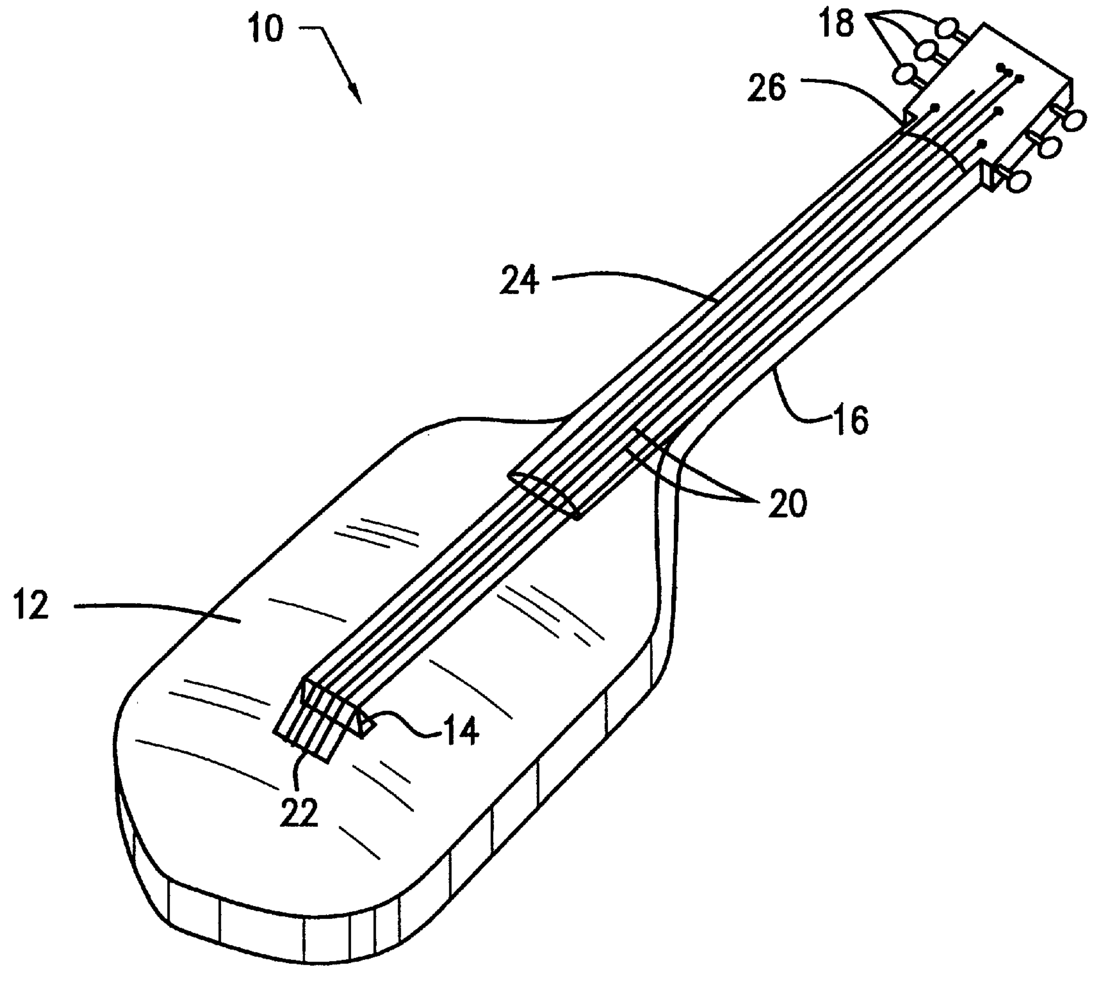
FIG. 1 is a perspective view of a simplified stringed musical instrument.
Figure 2:
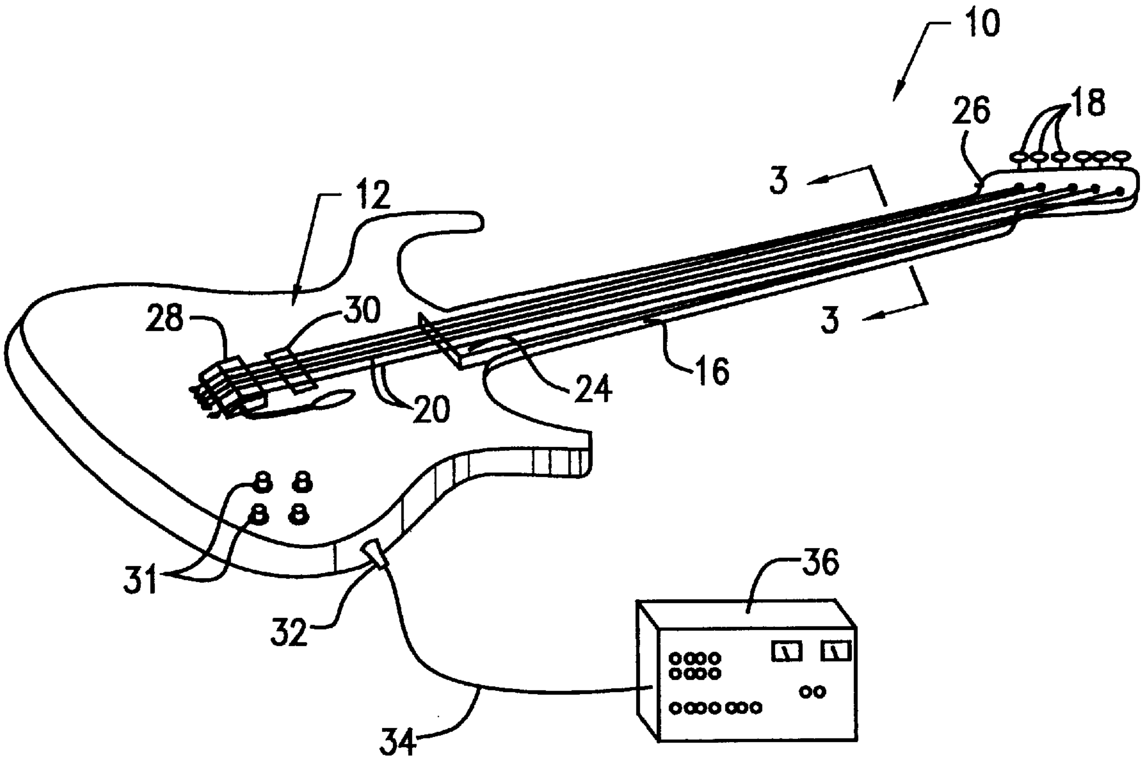
FIG. 2 is a perspective view of an electric guitar embodying the present invention.

Referring to FIG. 1, one embodiment of a fretless stringed musical instrument 10, according to present invention is shown. Another embodiment of the stringed musical instrument 10 is a guitar such as an electronic bass guitar as shown in FIG. 2. It should be appreciated that the string musical instrument 10 may be a violin, banjo, cello, lute, lyre, zither, or the like possessing one or more fingerboards. The term fingerboard, as used herein, refers to the playing surface on which the strings are pressed by the fingers of the musician.

Referring to FIG. 1, the fretless stringed musical instrument 10 includes a body 12, a bridge 14, and an elongated support or neck 16 which extends outwardly away from the body 12. The stringed musical instrument 10 also includes a string adjustment mechanism, or adjusting pegs 18 which in this instance is located at a distal end of the neck 16 and a plurality of strings 20 which are held at one end by the saddle 22 and bridge 14 and at the other end by the string tension adjusting mechanism 18.

The neck 16 includes a fingerboard 24 which is provided with a top nut 26 which serves as an outer suspension point for the strings 20. The strings 20 are suspended between the bridge 14 and the top nut 26 in a manner which allows them to vibrate freely when they are plucked, strummed, bowed or otherwise caused to vibrate in order to produce sound. The strings 20 follow in a parallel manner the major contour of the neck 16 and fingerboard 24 and are in close proximity thereto. It should be appreciated that the neck 16 can be in a form integral with the stringed musical instrument 10 or one that is a "bolt-on" attachment which can be detachably secured to the body 12 of the musical stringed instrument 10.

The fingerboard 24 is typically a modular unit comprising a flat, elongated piece made out of wood or a rigid man-made material, that is affixed to the neck 16 using an adhesive such as an epoxy resin, thermal plastic, unsupported acrylic and the like. Alternatively, the fingerboard may comprise the neck 16 of the instrument 10 itself. Either mode does not substantially affect the playing character of the stringed musical instrument 10.

FIG. 2 illustrates an stringed musical instrument in the form of an electric guitar, constructed in accordance with the features of the present invention including a body 12 and a neck 16 supporting a fingerboard 24. The body 12 is constructed from a dense hardwood such as mahogany using a standard solid body outline. The neck 16 being a "bolt-on" fixing, is also composed of a dense wood like mahogany. Other available materials and construction may be utilized, for example, flakeboard laminates, plastic resin/fiberglass, graphite/epoxy, steel reinforced hardwood, composite materials, and the like, as recognized by one of ordinary skill in the art. FIG. 2 also illustrates the strings 20 supported respectively at the neck 16 and body 12. The strings 20 are made of a standard nickel steel alloy. At the neck end, the strings 20 may be supported in a conventional fashion. In this regard adjusting pegs or the like are illustrated at 18.

The strings 20 supported at their body end the bridge mechanism 28. String adjustment may also be provided at the bridge mechanism 28. It is noted an inductive pickup mechanism 30 converts the vibration of the strings 20 into an electric signal. Control adjustment knobs 31 are provided to control volume and tone.

A jack 32 and cable 34 connects an electronic device 36 which may be an amplifier or synthesizer. On the inside of the guitar, the circuit board (not shown) may have lines coupling to the jack 32. In this way, the electrical signals from the pick up mechanism 30 can be coupled by way of the cable 34 to the device 36. All the parts such as the adjusting pegs, bridge mechanism, volume and tone controls, tail piece and top nut are those that are commercially available in the market. The chosen pickup mechanism 30 have been carefully selected for particular overdrive characteristics. After experimentation, it has been learned that high output (overdrive) pickups optimize the desired tonal characteristics in conjunction with the use of the present invention.

Figure 3A:
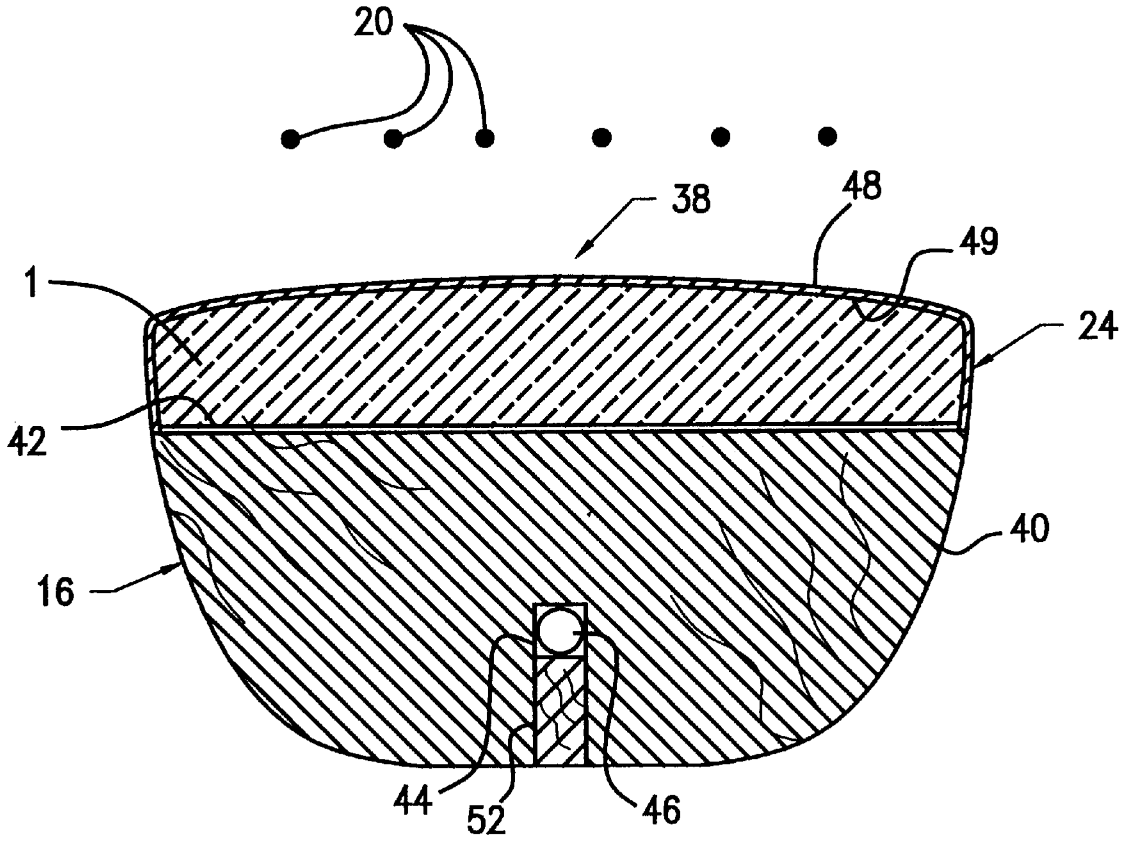
FIG. 3A is an enlarged cross sectional view of a guitar neck taken along line 3—3 of FIG. 2.

FIG. 3A shows a cross sectional view of the neck and fingerboard regions which includes a playing surface 38 that may be flat or curved (a curved playing surface being shown in FIG. 3A) to the longitudinal axis of the fingerboard as is common for fingerboards on stringed instruments. It should be appreciated that stringed musical instruments may have either flat or curved top surfaces for the fingerboards.

The neck 16 is comprised of a base board 40 on which a fingerboard 24 is affixed by means of an epoxy resin at interface 42. The base board 40 defines a cavity 44 along the length thereof for receiving a truss rod 46 which stiffens the neck 16 and counteracts the tension of strings 20. A wood filler 52 may optionally be used to fill the major portion of the cavity 44 to conceal the truss rod 46. The fingerboard 24 is comprised of a polymeric substrate 1 preferably polycarbonate. A diamond-like carbon composite, or DLC composite 48 hereinafter, is applied along a surface 49 of the polymeric substrate 1 as described in more detail hereinafter. The DLC composite 48 forms a exceptionally hard and low friction playing surface 38 that resists abrasions and wear caused by contact with the nickel steel strings 20, and improves the tone quality of the sound produced by the strings 20.

Figure 3B:
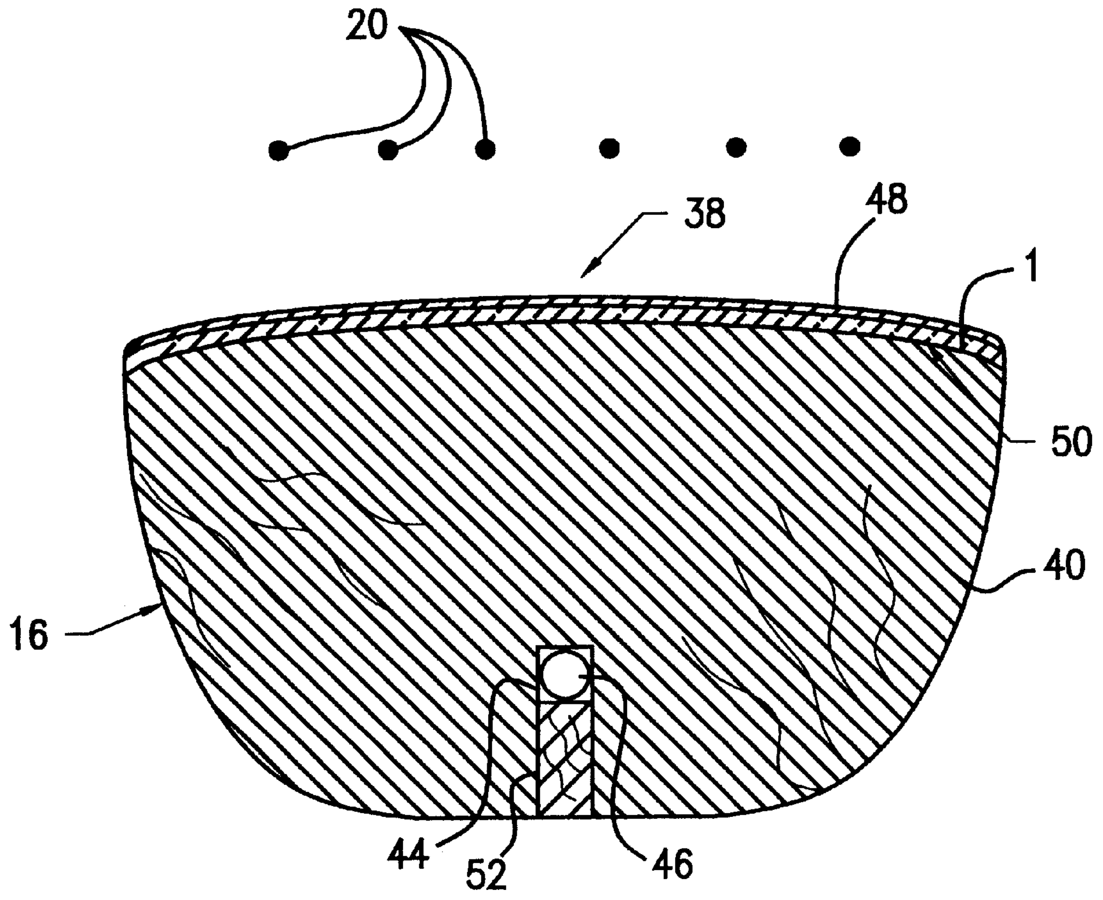
FIG. 3B is an enlarged cross sectional view of an alternative embodiment of a guitar neck taken along line 3—3 of FIG. 2.

In another embodiment of the present invention as shown in FIG. 3B, the neck 16 itself, serves as the fingerboard. In this embodiment, the material of the base board 40 is not polymer-based, i.e. hardwood. Therefore, to accomplish the results of the present invention, a polymeric coating substrate 1 preferably polycarbonate must be applied along the surface 50 of neck 16 before applying the DLC composite 48 thereon. However, if the base board 40 is composed of a polymer based material such as polycarbonate, the DLC composite 48 can be applied directly thereon.

The DLC composite 48 possesses a hardness level that exceeds the hardness level of nickel steel alloy strings 20. This hardness permits the top surface 38 of the fingerboard 24 or neck 16 to resist the wear and abrasion normally encountered during play. Fretted instruments are typically equipped with nickel steel alloy frets that can stand up to the abrasive effects of the nickel steel alloy strings. Prior bare fretless fingerboards were constructed out of aluminum or steel, hardwood, and various types of conventional plastics. These fingerboards had a very limited useful life. It is expensive and time consuming to replace worn fingerboards or necks. It is especially difficult for a musician on tour or playing on an extended leave to replace fingerboards or necks each time it becomes worn out.

The DLC composite 48 possesses a lower frictional resistance than that of glass and metals, such as aluminum and steel. This characteristic is very important for the tonal capability of the instrument . When a standard guitar is made fretless and the strings are fingered directly against the fingerboard, the timbre is very dull and the lower frequency notes are reproduced preferentially; higher harmonics are damped. This is not considered desirable from both an attack and decay envelope and tone quality standpoint unless the instrument is used as a bass. This property is linked to the fact that the human finger is soft and when pressed against a vibrating string, the vibrato is dampened considerably. The energy in the string is dissipated quickly. This is the reason why most fretless instruments are bowed. A bow sends a continuous stream of energy to sustain the vibration in spite of the soft fingers.

With low frictional resistance, the dampening effect of the fingers is minimized and an improved tonal response is generated. The hardness of the DLC composite 48 and its low frictional resistance permits the surface to act in effect as a fret under the musician's finger. This characteristic of the DLC composite 48 as applied to the surface of the fingerboard, affects the tone and timbre not previously encountered by a fretless or fretted instrument. This increases the capacity and versatility of fretless stringed musical instruments whether plucked, bowed, or strummed.

The surface characteristic of the DLC composite 48 allows the musician to approach a guitar as a violin without the need of a bow and explore various aspects of guitar technique not previously permitted. For example, the musician can gliss into and from individual notes with the attack and decay envelope of slide without its encumbrance and gliss to and from various chord formations that would not be permitted with a slide. Other variations in technique includes dextral tapping of notes on the fingerboard. The musician can gliss to and from the notes or chords fingered with the right hand over the left hand. This technique is not possible with other electric guitar, pedal steel, lap steel, or acoustic dobro.

With respect to components of the DLC composite 48, further details on the composite as applied to a polymeric parent substrate and its method of application of such, are disclosed in U.S. Pat. No. 5,190,807, incorporated herein by reference. The specific portions of the referenced patent that is being incorporated therein, extend from Column 4, line 66 to Column 11, line 32.

Figure 4A:
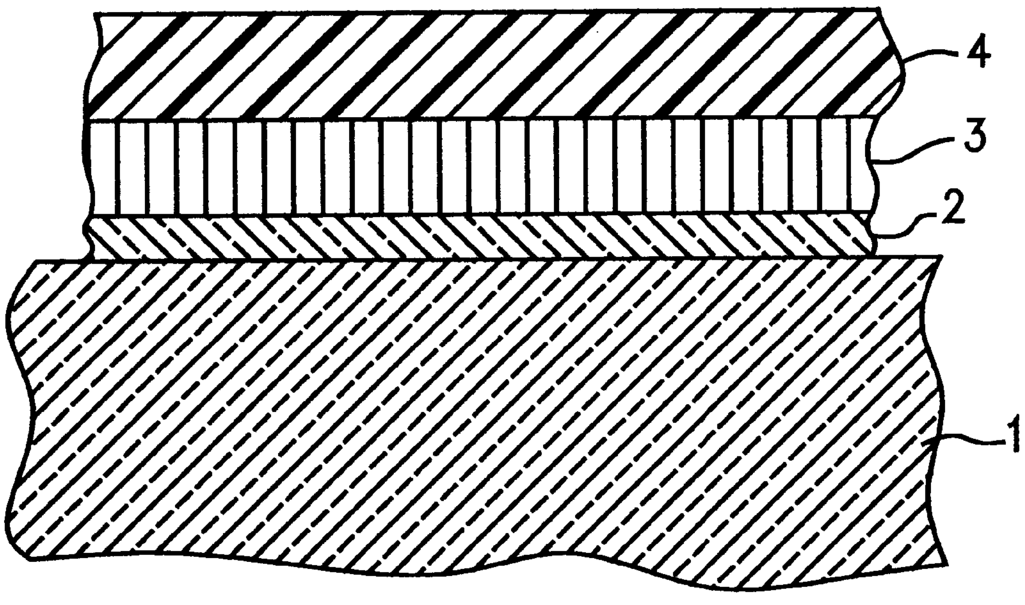
FIG. 4A is a further fragmentary sectional view of a portion of a diamond-like composite layer on a fingerboard indicated in FIG. 2.

FIG. 4A illustrates a further fragmentary sectional view of a portion of the DLC coated fingerboard 24 as indicated by the circled portion in FIG. 2. In the preferred embodiment of the invention, the polymeric parent substrate 1 is coated with an adhesion-mediating polysiloxane polymer layer 2 by a conventional dip, flow, spray, or other solution-based coating process. In accordance with the invention, it has been found that adherence of DLC composite 48 to a polymeric substrate is significantly improved, resulting in decidedly better product lifetime, when one applies an adherence transmitting intermediate layer, such as a polysiloxane polymer, between the polymeric substrate 1 and the diamond-like carbon layer 4 (i.e. inorganic hard layer). The enhanced adhesion between the polymeric substrate and a diamond-like carbon layer 4 is due, in part, to the fact that the elastic modulus and thermal expansion coefficient of the polysiloxane layer 2 is generally intermediate between that of the plastic substrate 1 and the diamond-like carbon layer 4, resulting in reduced expansion mismatch between the substrate 1 and the diamond-like carbon layer 4. Polysiloxane polymers are formed from monomers such as bi-, tri-, and tetra-function silanes, in which silicon atoms are bonded to hydrogen atoms, alcohol functional groups, or alkoxy functional groups. By conventional condensation polymerization (so-called thermal curing process) these monomeric mixtures are converted to oligomers, and subsequently into a 3-dimensional network polymer by elimination (or condensation) of water or alcohols. The degree of crosslinking in the polysiloxane polymer coating is determined by the amount of tri-, and tetra-functional monomers and/or the amount of prepolymerized crosslinking agents having reactive end groups which are included in the mixture. Polysiloxane polymer coatings can also incorporate additives such as resins (nylon, epoxy, melamine, etc.), hardeners, flow control agents, diluents, thickeners, catalysts, dyes, pigments, colloidal suspensions of silicon dioxide and other oxide materials which can be used to modify the properties of the coating. Polysiloxane polymer layers are indeed known per se, but not known has been their excellent suitability as an intermediate layer for improving adherence (primer) between plastics and DLC coatings.

By the term of "polysiloxane polymer", it is thus intended to mean a 3-dimensional network condensation polymer in which silicon atoms are bonded to 2–4 oxygen atoms. In the case of silicon bonded to 2 oxygen atoms, the oxygen atoms are inter-bonded to silicon atoms and these are a part of a repeating unit in a linear sense, forming linear runs of the polymer, and where the third and fourth bonding positions on the silicon atoms are occupied by unreactive organic functional groups, either alkyl or aryl groups. Furthermore, there will be some number of silicon atoms bonded to 3 oxygen atoms, and a lesser number of silicon atoms bonded to 4 oxygen atoms. In each case, those oxygen atoms bonded to silicon atoms are the cites for linking linear runs of the polymer to form a 3-dimensional network.

The adhesion-mediating polysiloxane polymer layer 2 can be from 1 to 20 microns in thickness. In the preferred embodiment form of the invention, the adhesion-mediating layer is at least 3 microns thick. It has been found that a critical polysiloxane layer thickness of at least 3 microns is necessary to provide the diamond-like carbon layer 4 with adequate mechanical support under high loads. This added support greatly reduces "crushing" of the diamond-like carbon layer 4 into the substrate 1, allowing the amount of abrasion protection offered by the diamond-like carbon layer 4 to be greatly increased.

Following deposition of the adhesion-mediating polysiloxane polymer layer, a first midlayer 3 is chemically vapor deposited onto the substantially optically transparent polymeric parent substrate 1. By the term of "chemically vapor deposited", it is intended to mean materials deposited by vacuum deposition processes, including thermal evaporation, electron beam evaporation, magnetron sputtering, and ion beam sputtering from solid precursor materials; thermally-activated deposition from reactive gaseous precursor materials; and glow discharge, plasma, or ion beam deposition from gaseous precursor materials. Preferably, the first midlayer 3 is deposited onto the parent substrate 1 by ion beam sputtering or magnetron sputtering when dense layers exhibiting compressive stress are desired, or by electron-beam evaporation when layers exhibiting tensile stress are desired, as discussed more fully herein.

The first midlayer 3 generally comprises a substantially optically transparent material devoid of alkali metal atoms and fluorine, and capable of forming a strong chemical bond to the coated substrate 1 and the diamond-like carbon layer 4. By the term of "strong chemical bond", it is intended to mean that the midlayer is composed of a significant amount of an element or elements which are capable of undergoing a chemical reaction with carbon to form carbide-bonding. The absence of alkali metals and fluorine is essential to achieve a highly adherent interface between the first to midlayer 3 and the diamond-like carbon layer 4. Thus, the first midlayer 3 must also have the property of providing a barrier to diffusion of alkali metals and additives from the parent substrate 1 to the diamond-like carbon layer 4.

The first midlayer 3 can be from 5 Å to 10,000 Å in thickness, preferably at least 10 Å thick, and may comprise silicon oxide, silicon dioxide, yttrium oxide, germanium oxide, hafnium oxide, tantalum oxide, titanium oxide, zirconium oxide tungsten oxide, molybdenum oxide, boron oxide or mixtures thereof. By the term "oxide", it is intended to mean a stoichiometrically oxidized material, or a partially oxidized material which contains excess metal atoms, or is deficient in oxygen. The first midlayer may further comprise silicon nitride, titanium nitride, tantalum nitride, hafnium nitride, zirconium nitride, boron nitride, tungsten nitride, molybdenum nitride, silicon carbide, germanium carbide and mixtures thereof. By the term "nitride", it is intended to mean a material composed of a stoichiometric amount of nitrogen or a material which either contains excess nitrogen atoms, or is deficient in nitrogen. By the term "carbide", it is intended to mean a material composed of a stoichiometric amount of carbon or a material which either contains excess carbon atoms, or is deficient in carbon.

In the preferred embodiment form of the invention, the first midlayer 3 comprises silicon dioxide. Silicon dioxide is the preferred midlayer material due to (I) its chemical similarity with the polysiloxane polymer adhesion-mediating layer 2 and the resultant affinity to form a strong chemical bond thereto and (ii) its ability to form an excellent chemical bond to diamond-like carbon. In accordance with the invention, it has been found that the thickness of the silicon dioxide first midlayer 3 should be from 200 Å to 2000 Å to achieve optimum adhesion of the diamond-like carbon layer 4. Generally, the necessary thickness of the silicon dioxide midlayer 3 is dependent upon the nature of the polymeric substrate material, the physical characteristics of the diamond-like carbon layer 4 bonded to the silicon dioxide first midlayer 3, and the degree of adhesion required for the particular application. For example, it has been found that when silicon dioxide layers less than approximately 400 Å are employed as coatings over polycarbonate substrates, diamond-like carbon layers of thicknesses greater than 850 Å will undergo adhesion failure when the substrate is thermally cycled. However, silicon dioxide layers of approximately 200 Å are sufficient to promote excellent adhesion with substrates exhibiting a lower thermal expansion coefficient (i.e. CR-39® and acrylic plastics) and/or diamond-like carbon layers of thickness less than 850 Å. In accordance with the invention, it is therefore preferable that the silicon dioxide first midlayer 3 be at least 200 Å thick.

Following deposition of the first midlayer 3 onto the coated parent substrate 1, the diamond-like carbon layer 4 is chemically vapor deposited onto the coated substrate. The diamond-like carbon layer 4 can be from 10 Å to 10 Å micrometers in thickness. Preferably, the diamond-like carbon layer 4 is at least 200 Å thick.

Figure 4B:
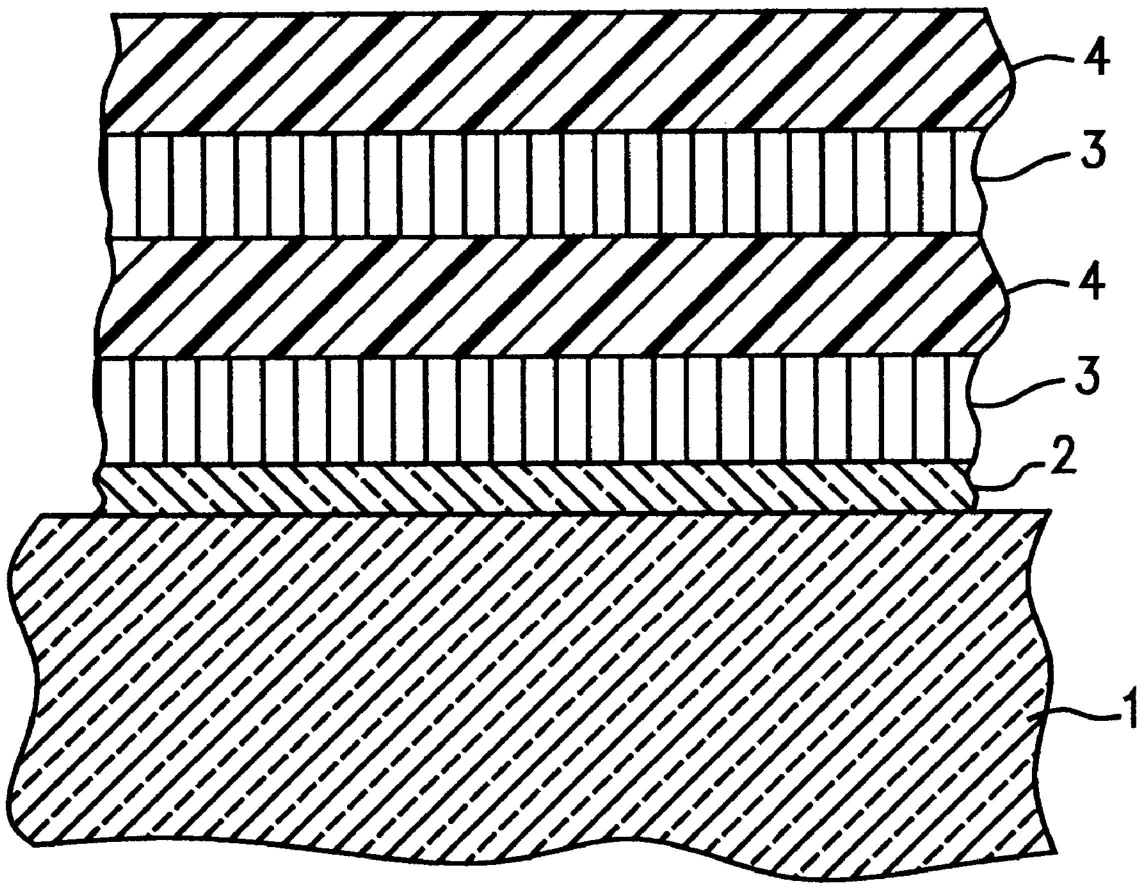
FIG. 4B is a further fragmentary sectional view of a portion of an alternate embodiment of the diamond-like carbon composite layer on the fingerboard indicated in FIG. 2.

To further enhance the abrasion wear resistance of the structure, more than one midlayer or a plurality of alternating midlayers 3 and diamond-like carbon layers 4 may be deposited onto the parent substrate 1, as shown in FIG. 4B. In a further envisioned embodiments of the invention not shown, the structure also may comprise a parent substrate 1, an adhesion-mediating layer 2, two or more different midlayers, a first diamond-like carbon layer 4, a first midlayer 3 and a second diamond-like carbon layer 4. It has been found that such arrangements allow for the deposition of a greater total thickness of DLC material, which provides a further increase in abrasion resistance.

However, as the thickness of the coated substrate product increases, control of the stresses in the respective diamond-like carbon layer(s) 4 and the midlayer(s) 3 becomes imperative. For example, if the midlayer 3 (e.g. silicon dioxide) is deposited onto the parent substrate 1 with an excessive tensile stress, the midlayer 3 may craze or crack. If the midlayer 3 is deposited onto the parent substrate 1 with an excessive compressive stress, problems with the adherence of the midlayer 3 and diamond-like carbon layer(s) 4 may be encountered. Therefore in the preferred embodiment form of the invention, the compressive stress in the midlayer(s) 3 is less than the compressive stress in the diamond-like carbon layer(s) 4; more preferably, the compressive stress in the midlayer(s) 3 is intermediate between the compressive stress of the diamond-like carbon layer(s) 4 and the adhesion-mediating layer 2.

Alternatively, the midlayer(s) 3 may be deposited onto the parent substrate 1 under tensile stress. This may be achieved by evaporative deposition of the midlayer(s) 3. The advantage of depositing the midlayer(s) 3 under tensile stress would be that the tensile stress in the midlayer(s) 3 would tend to cancel out the compressive stress in the diamond-like carbon layer(s) 4, allowing for a much thicker composite structure.

In accordance with a further aspect of the invention, the modulus of elasticity and hardness of the midlayer(s) 3 is preferably less than the modulus of elasticity and hardness of the diamond-like carbon layer 4; more preferably, the modulus of elasticity of the midlayer(s) 3 is intermediate that of the diamond-like carbon layer 4 and the adhesion-mediating layer 2, and the hardness of the diamond-like carbon layer 4 is at least twice as hard as the underlying midlayer(s) 3. With this particular arrangement, the impact resistance of the parent substrate 1 will be significantly enhanced.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A stringed musical instrument comprising a body portion including one or more strings secured thereto thereby defining a stringed portion, said stringed portion comprising a polymeric material, and including a surface which comes into contact with the strings when a musician plays the musical instrument, said surface having thereon a first composite layer comprising:

an adhesion-mediating layer at least 3 microns thick operatively engaged to and disposed towards said surface of said polymeric material of the stringed portion, said adhesion-mediating layer comprising a polysiloxane polymer having a high elasticity and capable of forming a strong chemical bond to said surface;

a first substantially optically transparent midlayer chemically vapor deposited on said adhesion-mediating layer and comprising a material devoid of alkali metal atoms and fluorine; and a first layer of diamond-like carbon chemically vapor deposited on said first midlayer on a surface away from said surface of said polymeric material; said first midlayer forming a strong bond to said adhesion mediating layer and diamond-like carbon.

2. The string musical instrument of claim 1 wherein said diamond-like carbon layer is at least 200 Å thick.

3. The stringed musical instrument of claim 1 wherein said first midlayer comprises a material selected from the group consisting of silicon nitride, titanium nitride, tantalum nitride, tungsten nitride, molybdenum nitride, hafnium nitride, zirconium nitride, boron nitride, silicon oxide, silicon dioxide, yttrium oxide, germanium oxide, hafnium oxide, tantalum oxide, titanium oxide, zirconium oxide, tungsten oxide, molybdenum oxide, boron oxide, silicon carbide, germanium carbide and mixtures thereof.

4. The stringed musical instrument of claim 3 wherein said first midlayer is at least 10 Å thick.

5. The stringed musical instrument of claim 1 wherein said first midlayer further comprises silicon dioxide at least 200 Å thick.

6. The stringed musical instrument of claim 1 wherein the compressive stress of said first midlayer is less than said first diamond-like carbon layer and greater than said adhesion-mediating layer.

7. The stringed musical instrument of claim 1 wherein said first midlayer exhibits a tensile stress and said first diamond-like carbon layer exhibits a compressive stress.

8. The stringed musical instrument of claim 1 including at least a second composite layer operatively engaged to and disposed immediately adjacent to said first composite layer, said second composite layer comprising a second midlayer operatively engaged to and disposed immediately adjacent to said first diamond-like carbon layer and away from said surface of said polymeric material of the stringed portion and a second diamond-like carbon layer operatively engaged to and disposed immediately adjacent to said second midlayer and away from said surface of said polymeric material of the stringed portion.

9. The stringed musical instrument of claim 8 wherein said second midlayer comprises a material selected from the group consisting of silicon nitride, titanium nitride, tantalum nitride, tungsten nitride, molybdenum nitride, hafnium nitride, zirconium nitride, boron nitride, silicon oxide, silicon dioxide, yttrium oxide, germanium oxide, tungsten oxide, molybdenum oxide, boron oxide, hafnium oxide, tantalum oxide, titanium oxide, zirconium oxide, silicon carbide, germanium carbide and mixtures thereof.

10. The stringed musical instrument of claim 9 wherein the thickness of said second midlayer is at least 10 Å thick.

11. The stringed musical instrument of claim 8 wherein said second midlayer comprises silicon dioxide at least 200 Å thick.

12. The stringed musical instrument of claim 8 wherein the thickness of said second diamond-like carbon layer is at least 200 Å thick.

13. The stringed musical instrument of claim 8 wherein the compressive stress of said second midlayer is less than said second diamond-like carbon layer.

14. The stringed musical instrument of claim 8 wherein said second midlayer exhibits a tensile stress and said first diamond-like carbon layer and said second diamond-like carbon layer exhibit a compressive stress.

15. A stringed musical instrument comprising a body portion including one or more strings secured thereto, thereby defining a stringed portion, said stringed portion comprising a polymeric material, and including a surface which comes into contact with the strings when a musician plays the musical instrument, said surface having thereon:

an adhesion mediating layer comprising a polysiloxane polymer at least 3 microns thick being operatively engaged to and disposed towards said surface, said adhesion-mediating layer having high elasticity and capable of forming a strong chemical bond to said surface;

a substantially optically transparent midlayer of a material devoid of alkali metal atoms and fluorine, being operatively engaged to said adhesion-mediating layer; and a outer layer of a hard and low friction diamond-like carbon operatively engaged to said midlayer, said midlayer being capable of forming a strong chemical bond to said adhesion-mediating layer and a strong chemical bond to the carbon-like carbon layer.

* * * * *